(12) United States Patent
Zhang et al.

(10) Patent No.: US 10,305,167 B2
(45) Date of Patent: May 28, 2019

(54) ANTENNA CIRCUIT, TERMINAL DEVICE, AND METHOD FOR DISPOSING ANTENNA CIRCUIT

(71) Applicant: Huawei Device (Dongguan) Co., Ltd., Dongguan (CN)

(72) Inventors: Xikui Zhang, Shenzhen (CN); Tiezhu Liang, Beijing (CN); Yukun Guo, Beijing (CN); Hui Li, Shenzhen (CN)

(73) Assignee: Huawei Device Co., Ltd., Dongguan (CN)

( * ) Notice: Subject to any disclaimer, the term of this patent is extended or adjusted under 35 U.S.C. 154(b) by 170 days.

(21) Appl. No.: 15/307,328

(22) PCT Filed: Apr. 29, 2014

(86) PCT No.: PCT/CN2014/076519
§ 371 (c)(1),
(2) Date: Oct. 27, 2016

(87) PCT Pub. No.: WO2015/165050
PCT Pub. Date: Nov. 5, 2015

(65) Prior Publication Data
US 2017/0047643 A1 Feb. 16, 2017

(51) Int. Cl.
*H01Q 1/24* (2006.01)
*H04M 1/02* (2006.01)
*H01Q 1/50* (2006.01)
*H01Q 1/42* (2006.01)

(52) U.S. Cl.
CPC ............. *H01Q 1/243* (2013.01); *H01Q 1/42* (2013.01); *H01Q 1/50* (2013.01); *H04M 1/02* (2013.01); *H04M 1/0202* (2013.01)

(58) Field of Classification Search
CPC ........... H01Q 1/243; H01Q 1/50; H01Q 1/22; H01Q 1/42; H04M 1/02; H04M 1/0202
See application file for complete search history.

(56) References Cited

U.S. PATENT DOCUMENTS

| 4,980,694 | A | * | 12/1990 | Hines | ..................... | H01Q 1/243 343/700 MS |
| 5,337,061 | A | * | 8/1994 | Pye | ......................... | H01Q 1/242 343/702 |
| 5,412,392 | A | * | 5/1995 | Tsunekawa | ............. | H01Q 1/244 343/702 |

(Continued)

FOREIGN PATENT DOCUMENTS

| CN | 101867629 A | 10/2010 |
| CN | 102624946 A | 8/2012 |

(Continued)

*Primary Examiner* — Tho G Phan

(57) ABSTRACT

An antenna circuit includes a first antenna circuit, a second antenna circuit, and a connection hole. The first antenna circuit is disposed on a non-exterior surface of a terminal device; the second antenna circuit is disposed on an exterior surface of the terminal device, where the exterior surface is a surface of the terminal device visible to a user, and the non-exterior surface is disposed opposite to the exterior surface; and the connection hole penetrates through the non-exterior surface and the exterior surface, where the first antenna circuit and the second antenna circuit are electrically connected by using the connection hole.

16 Claims, 7 Drawing Sheets

(56) References Cited

U.S. PATENT DOCUMENTS

| | | | | |
|---|---|---|---|---|
| 6,188,362 | B1* | 2/2001 | Igarashi | H01Q 1/24 343/702 |
| 6,650,295 | B2* | 11/2003 | Ollikainen | H01Q 1/243 343/700 MS |
| 7,427,960 | B2* | 9/2008 | Mizutani | H01Q 1/2225 343/702 |
| 9,431,693 | B2* | 8/2016 | Kwak | H01Q 1/243 |
| 2011/0222219 | A1* | 9/2011 | Bae | H01Q 1/243 361/679.01 |
| 2013/0109329 | A1 | 5/2013 | Na et al. | |

FOREIGN PATENT DOCUMENTS

| | | |
|---|---|---|
| CN | 103095874 A | 5/2013 |
| CN | 202997039 U | 6/2013 |
| CN | 103337690 A | 10/2013 |

\* cited by examiner

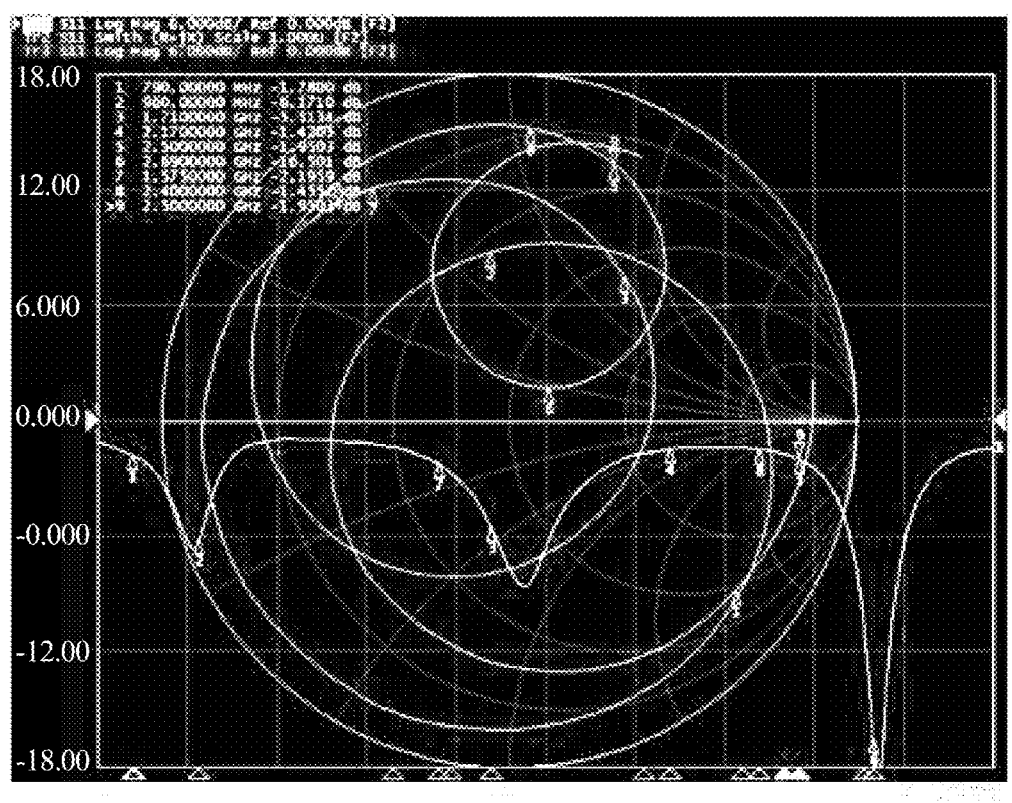
FIG. 7-a

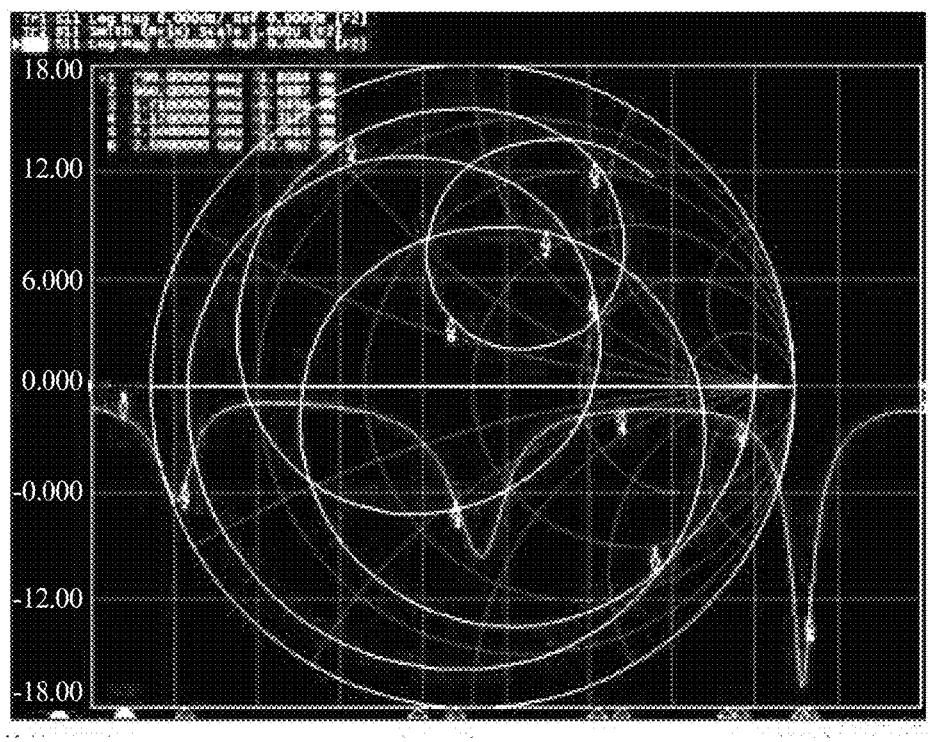
FIG. 7-b
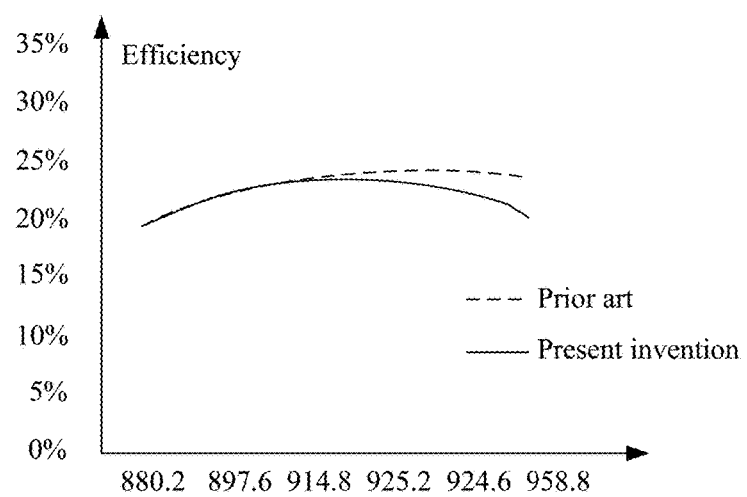
FIG. 8-a

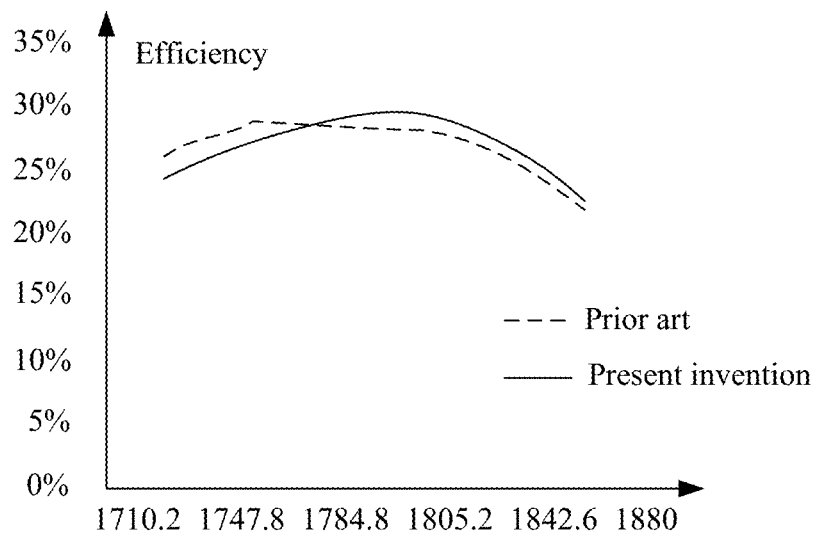
FIG. 8-b
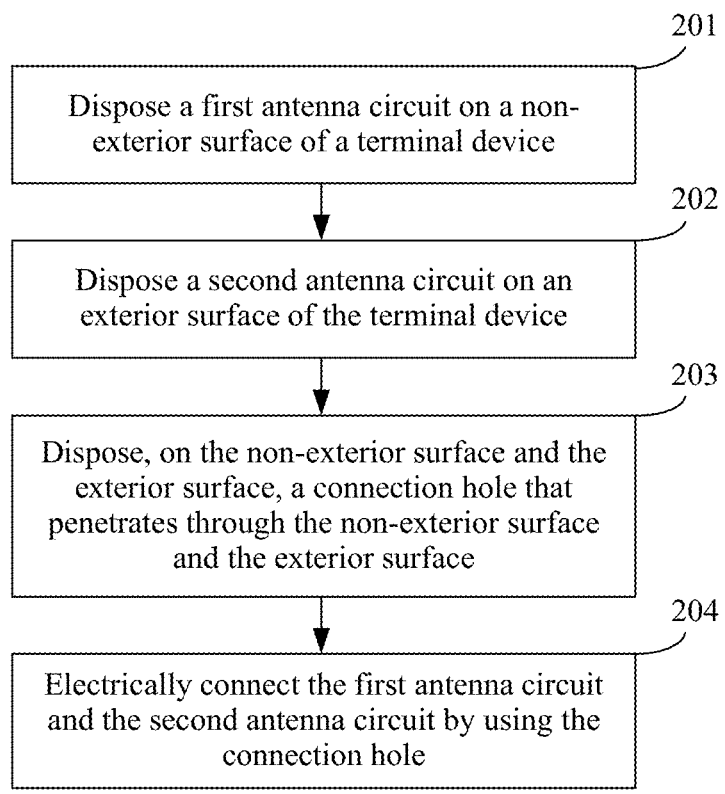
FIG. 9

ANTENNA CIRCUIT, TERMINAL DEVICE, AND METHOD FOR DISPOSING ANTENNA CIRCUIT

CROSS REFERENCE TO RELATED APPLICATIONS

The present application claims priority under 35 U.S.C. § 365 to International Patent Application No. PCT/CN2014/076519 filed Apr. 29, 2014 which is hereby incorporated by reference in its entirety.

TECHNICAL FIELD

The present invention relates to the field of electronic terminals, and in particular, to an antenna circuit, a terminal device, and a method for disposing an antenna circuit.

BACKGROUND

Currently, a terminal device has an increasingly compact structure. Stack architecture design of the entire device leaves less space available for an antenna, and an increasing number of mobile phone projects apply LDS (Laser Direct Structuring, laser direct structuring technology) to entire housings, so as to ensure a compact structure and maximize antenna performance at the same time.

In the prior art, using a mobile phone as an example, to make full use of space and maximize antenna performance of the mobile phone, an antenna circuit is disposed on an outer surface of a rear enclosure, and an inner surface of the rear enclosure is seamlessly connected to a display screen. As shown in FIG. 1, the outer surface includes a side of the outer surface and a front face of the outer surface. A battery cover of the mobile phone needs to cover the antenna circuit, that is, the battery cover encloses an exterior surface and a side of the rear enclosure. However, a width of the mobile phone is increased by thickness of the battery cover, and accordingly, an overall size of the mobile phone is increased.

SUMMARY

Embodiments of the present invention provide an antenna circuit, a terminal device, and a method for disposing an antenna circuit, which can reduce a size of the terminal device while ensuring good antenna performance.

To achieve the foregoing objective, the following technical solutions are used in the embodiments of the present invention:

According to a first aspect, an antenna circuit is provided, where the antenna circuit includes a first antenna circuit, a second antenna circuit, and a connection hole, where the first antenna circuit is disposed on a non-exterior surface of a terminal device;

the second antenna circuit is disposed on an exterior surface of the terminal device, where the exterior surface is a surface of the terminal device visible to a user, and the non-exterior surface is disposed opposite to the exterior surface; and the connection hole penetrates through the non-exterior surface and the exterior surface, where the first antenna circuit and the second antenna circuit are electrically connected by using the connection hole.

With reference to the first aspect, in a first implementable manner of the first aspect, the antenna circuit further includes a connection conductor, where that the first antenna circuit and the second antenna circuit are electrically connected by using the connection hole specifically includes: the first antenna circuit and the second antenna circuit are electrically connected by using the connection conductor that penetrates through the connection hole.

With reference to the first implementable manner of the first aspect, in a second implementable manner of the first aspect, a diameter of the connection hole is from 0.4 millimeter to 0.6 millimeter.

With reference to the first implementable manner or the second implementable manner of the first aspect, in a third implementable manner of the first aspect, a draft angle of the connection hole with respect to the non-exterior surface and a draft angle of the connection hole with respect to the exterior surface are both from 15 degrees to 30 degrees.

With reference to the first aspect, and the first implementable manner to the third implementable manner of the first aspect, in a fourth implementable manner of the first aspect, a structure of the non-exterior surface is set according to a feature of the first antenna circuit.

With reference to the first aspect, and the first implementable manner to the fourth implementable manner of the first aspect, in a fifth implementable manner of the first aspect, a length of the first antenna circuit is greater than a length of the second antenna circuit.

With reference to the first aspect, and the first implementable manner to the fifth implementable manner of the first aspect, in a sixth implementable manner of the first aspect, the first antenna circuit is disposed on the non-exterior surface by using a laser engraving technology;

the second antenna circuit is disposed on the exterior surface by using a laser engraving technology; and the connection conductor is disposed inside the connection hole by using a laser engraving technology.

According to a second aspect, a terminal device is provided, and the terminal device includes the antenna circuit according to the first aspect.

According to a third aspect, a method for disposing an antenna circuit is provided, and the method includes:

disposing a first antenna circuit on a non-exterior surface of a terminal device;

disposing a second antenna circuit on an exterior surface of the terminal device, where the exterior surface is a surface of the terminal device visible to a user, and the non-exterior surface is disposed opposite to the exterior surface;

disposing, on the non-exterior surface and the exterior surface, a connection hole that penetrates through the non-exterior surface and the exterior surface; and electrically connecting the first antenna circuit and the second antenna circuit by using the connection hole.

With reference to the third aspect, in a first implementable manner of the third aspect, the electrically connecting the first antenna circuit and the second antenna circuit by using the connection hole specifically includes:

disposing a connection conductor in the connection hole; and electrically connecting the first antenna circuit and the second antenna circuit by using the connection conductor.

The present invention provides an antenna circuit, a terminal device, and a method for disposing an antenna circuit. The antenna circuit includes a first antenna circuit, a second antenna circuit, and a connection hole, where the first antenna circuit is disposed on a non-exterior surface of the terminal device; the second antenna circuit is disposed on an exterior surface of the terminal device, where the exterior surface is a surface of the terminal device visible to a user, and the non-exterior surface is disposed opposite to the exterior surface; and the connection hole penetrates through the non-exterior surface and the exterior surface, where the first antenna circuit and the second antenna circuit are electrically connected by using the connection hole. In this way, compared with the prior art, the antenna circuit is no longer disposed on an outer surface of a rear enclosure; instead, the antenna circuit is disposed on the non-exterior surface of the terminal device and the exterior surface of the terminal device. Therefore, a length of the second antenna circuit disposed on the exterior surface is reduced. Accordingly, a material used to cover the second antenna circuit is accordingly reduced, which reduces a size of the terminal device while ensuring good antenna performance.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 7-*a* and FIG. 7-*b* are a diagram of comparison between a reflection loss and impedance of an antenna in a terminal device according to an embodiment of the present invention and a reflection loss and impedance of an antenna in a terminal device in the prior art;

FIG. 8-*a* and FIG. 8-*b* are a diagram of comparison between antenna performance of a terminal device according to an embodiment of the present invention and antenna performance of a terminal device in the prior art; and FIG. 9 is a flowchart of a method for disposing an antenna circuit according to an embodiment of the present invention.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 2:
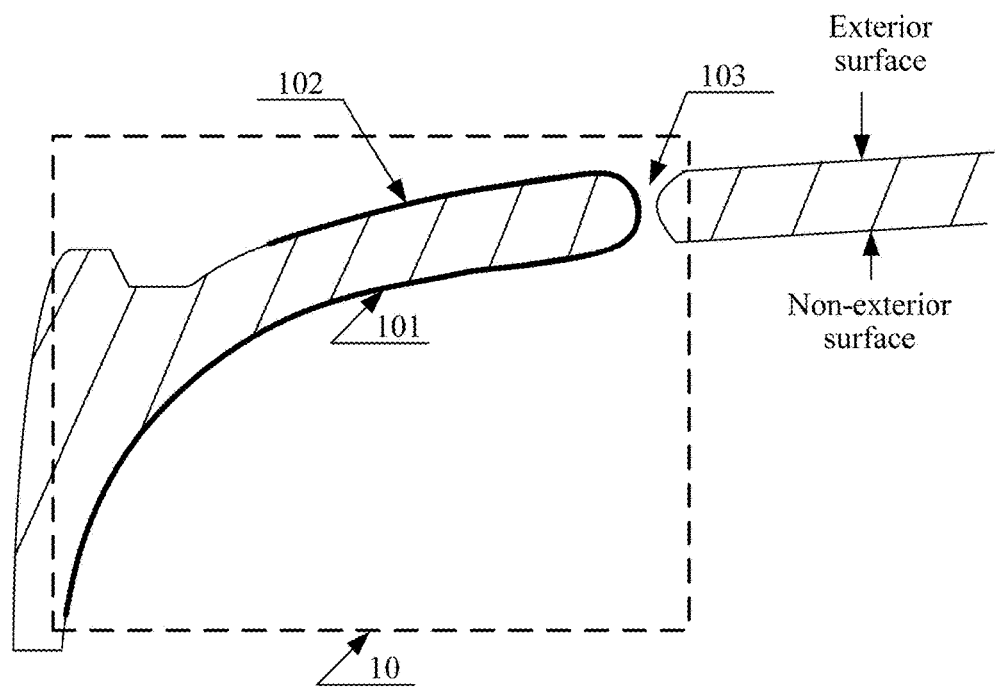
FIG. 2 is a schematic structural diagram of an antenna circuit according to an embodiment of the present invention.

An embodiment of the present invention provides an antenna circuit 10, and as shown in FIG. 2, the antenna circuit includes a first antenna circuit 101, a second antenna circuit 102, and a connection hole 103.

The first antenna circuit 101 is disposed on a non-exterior surface of a terminal device.

Figure 3:
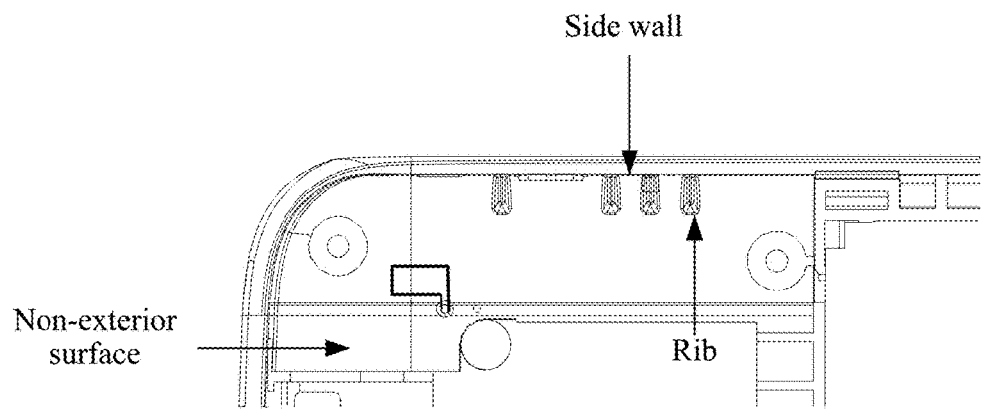
FIG. 3 is a schematic structural diagram of a rib and a side wall of a terminal device according to an embodiment of the present invention.

The non-exterior surface of the terminal device may be an inner surface, of a housing of the terminal device, opposite to a non-display surface of a display screen of the terminal device. Generally, a user cannot view the inner surface; the user can view the inner surface only after the terminal device is disassembled. A structure of the non-exterior surface is set according to a feature of the first antenna circuit 101. As shown in FIG. 3, the structure may include a rib and a side wall. The feature of the first antenna circuit 101 refers to a routing arrangement of the first antenna circuit 101, and is determined by a frequency of an antenna.

Specifically, to make the most use of available space on the non-exterior surface, a designer of the antenna circuit adds a corresponding rib and side wall at a corresponding position on the non-exterior surface according to the routing arrangement of the first antenna circuit 101, so that the first antenna circuit 101 can wind along the rib and the side wall for multiple times, thereby increasing utilization of the available space on the non-exterior surface.

The rib may be a protrusion on the non-exterior surface, and the side wall may be a connection part between ribs or a partial side structure of the inner surface of the housing of the terminal device.

The second antenna circuit 102 is disposed on an exterior surface of the terminal device.

The exterior surface may be a surface of the terminal device visible to the user, and the non-exterior surface is disposed opposite to the exterior surface. That is, the non-exterior surface of the terminal device may be an outer surface of the housing of the terminal device, and the outer surface is a reverse side of the inner surface of the housing of the terminal device.

Generally, the exterior surface may be classified into two types according to whether the exterior surface can be directly viewed by the user. A first type of exterior surface is an exterior surface that can be directly viewed by the user, and a second type of exterior surface is an exterior surface that can be indirectly viewed by the user.

Optionally, when the outer surface is an exterior surface that can be directly viewed by the user, and user equipment has only one layer of housing, the exterior surface that can be directly viewed by the user is an outer surface of the housing of the terminal device, except a part that may enclose a display surface of the display screen of the terminal device. Exemplarily, an all-in-one mobile phone is used as an example. Generally, the all-in-one mobile phone has only one layer of housing, and a mobile phone battery cannot be removed. The exterior surface that can be directly viewed by the user may be an outer surface, of the housing of the all-in-one mobile phone, except part that may enclose a display surface of a display screen of the all-in-one mobile phone.

Figure 1:
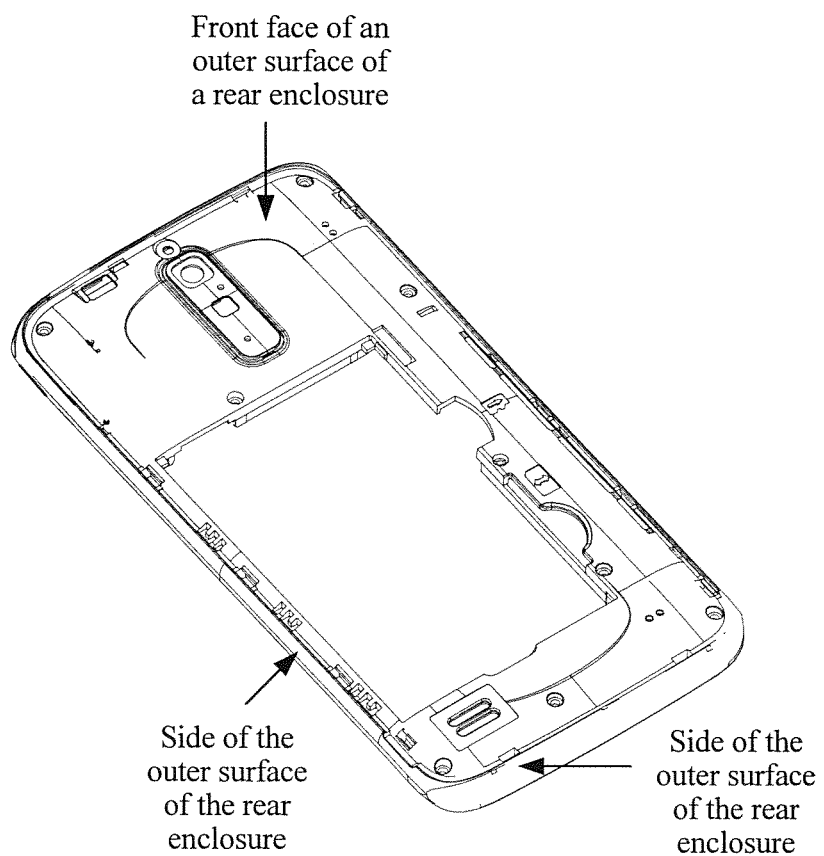
FIG. 1 is a schematic structural diagram of an outer surface of a rear enclosure of a mobile phone in the prior art.

Optionally, when the outer surface is an exterior surface that can be indirectly viewed by the user, generally, the terminal device has two layers of housing: one layer is a rear enclosure of the terminal device, and the other layer is a cover of the terminal device, where the rear enclosure is located between the cover of the terminal device and the display screen of the terminal device. The exterior surface that can be indirectly viewed by the user may be an outer surface, of the rear enclosure, opposite to an inner surface of the cover. Exemplarily, a non-all-in-one mobile phone is used as an example. Generally, a mobile phone battery of the non-all-in-one mobile phone can be removed. The non-all-in-one mobile phone includes a display screen, a rear enclosure, and a battery cover (that is, the cover of the terminal device). The outer surface that can be indirectly viewed by the user refers to a front face of an outer surface of the rear enclosure of the non-all-in-one mobile phone after the battery cover is opened, as shown in FIG. 1. The non-all-in-one mobile phone further includes an outer surface that can be directly viewed by the user, that is, a side of the outer surface of the rear enclosure of the non-all-in-one mobile phone, as shown in FIG. 1.

The connection hole 103 penetrates through the non-exterior surface and the exterior surface.

The first antenna circuit 101 and the second antenna circuit 102 are electrically connected by using the connection hole.

It should be noted that, a length of the first antenna circuit 101 is greater than a length of the second antenna circuit 102.

In this way, compared with the prior art, the antenna circuit is no longer disposed on an outer surface of a rear enclosure; instead, the antenna circuit is disposed on the non-exterior surface of the terminal device and the exterior surface of the terminal device. Therefore, a length of the second antenna circuit disposed on the exterior surface is reduced. Accordingly, a material used to cover the second antenna circuit is accordingly reduced, which reduces a size of the terminal device while ensuring good antenna performance.

Figure 4:
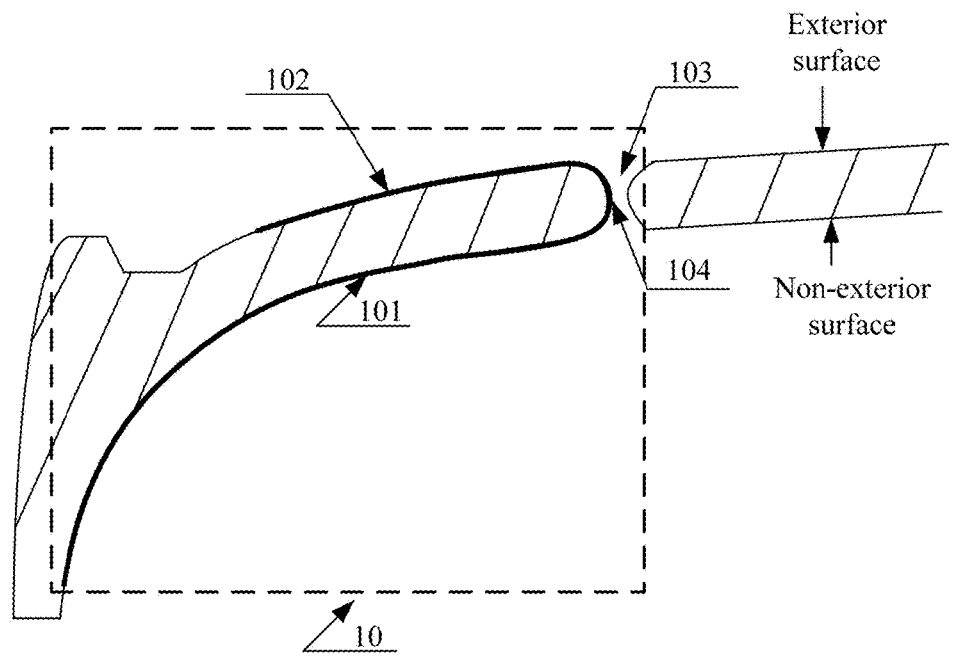
FIG. 4 is a schematic structural diagram of another antenna circuit according to an embodiment of the present invention.

Further, the first antenna circuit 101 and the second antenna circuit 102 may be directly connected, or may be indirectly connected. As shown in FIG. 4, when the first antenna circuit 101 and the second antenna circuit 102 are indirectly connected, the antenna circuit 10 may further include a connection conductor 104.

Figure 5:
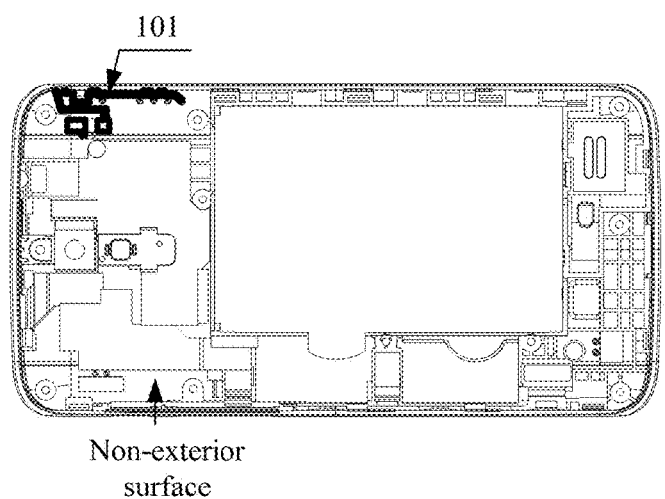
FIG. 5 is a schematic structural diagram of a first antenna circuit according to an embodiment of the present invention.
Figure 6:
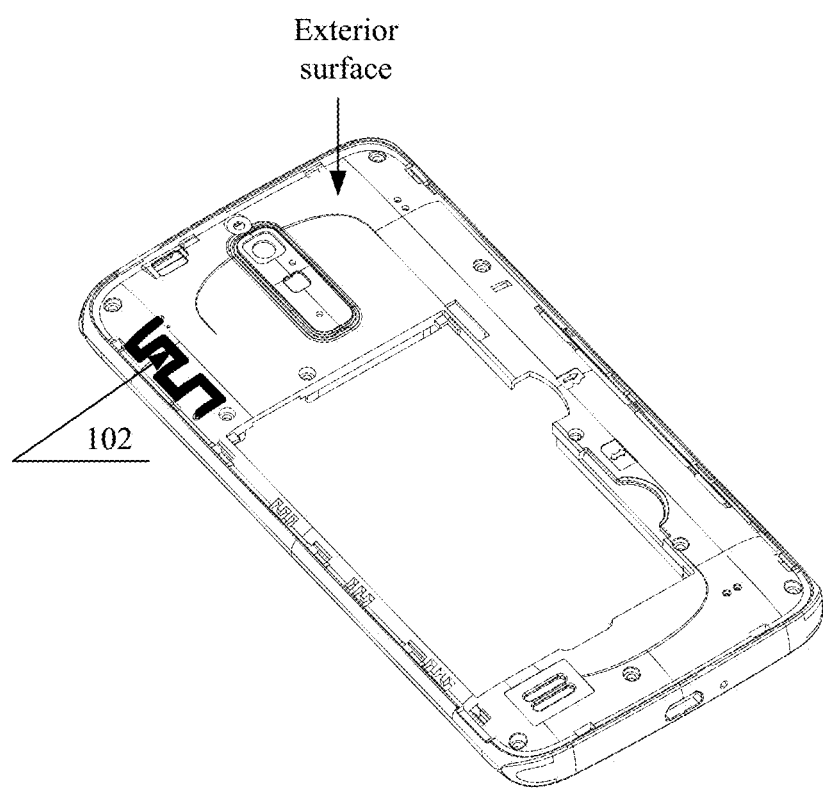
FIG. 6 is a schematic structural diagram of a second antenna circuit according to an embodiment of the present invention.

Because the connection hole 103 connects the non-exterior surface to the exterior surface, the first antenna circuit 101 (as shown in FIG. 5) on the non-exterior surface can be connected to the second antenna circuit 102 (as shown in FIG. 6) on the exterior surface by using the connection conductor 104 in the connection hole 103, where the connection conductor 104 is disposed in the connection hole 103 by using a laser engraving technology. It should be noted that, materials of the first antenna circuit 101 and the second antenna circuit 102 are the same as a material of the connection conductor.

The first antenna circuit 101 is disposed on the non-exterior surface by using a laser engraving technology, the second antenna circuit 102 is disposed on the exterior surface by using a laser engraving technology, and the connection conductor 104 is disposed in the connection hole 103 by using a laser engraving technology.

Optionally, a diameter of the connection hole 104 may be from 0.4 millimeter to 0.6 millimeter, and a draft angle of the connection hole 104 with respect to the non-exterior surface and a draft angle of the connection hole 104 with respect to the exterior surface are both from 15 degrees to 30 degrees. Preferably, the diameter of the connection hole 104 may be 0.5 millimeter, and the draft angle of the connection hole 104 with respect to the non-exterior surface and the draft angle of the connection hole 104 with respect to the exterior surface are both 30 degrees. To better detach (remove) a workpiece from a mold, the draft angle is a manually set angle between a side tangent direction, obtained by inter-section between the workpiece and a parting surface of the mold, and a normal direction of the parting surface of the mold.

FIG. 7-a is a comparison diagram of a reflection loss and impedance of an antenna in a terminal device in the prior art. FIG. 7-b is a comparison diagram of a reflection loss and impedance of an antenna in a terminal device according to an embodiment of the present invention. In the diagrams, six points are marked in FIG. 7-a, six corresponding points are marked in FIG. 7-b, and the 12 points in the two diagrams are separately compared. As shown in Table 1, for example, when a frequency is 790 megahertz, the reflection loss of the antenna in the terminal device in the prior art is −1.78 bits, and the reflection loss of the antenna in the terminal device in this embodiment is −1.8084. When the frequency is 960 megahertz, the reflection loss of the antenna in the terminal device in the prior art is −6.171 bits, and the reflection loss of the antenna in the terminal device in this embodiment is −5.4887. It can be easily learned from Table 1 that, on a same frequency, the reflection loss of the antenna in the terminal device in this embodiment is extremely close to the reflection loss of the antenna in the terminal device in the prior art.

TABLE 1

|   | Frequency (megahertz) | Reflection loss of the antenna in the prior art (bit) | Reflection loss of the antenna in this embodiment (bit) |
| --- | --- | --- | --- |
| 1 | 790 | −1.78 | −1.8084 |
| 2 | 960 | −6.171 | −5.4887 |
| 3 | 1.71 | −5.5134 | −6.5456 |
| 4 | 2.17 | −1.4205 | −1.3127 |
| 5 | 2.5 | −1.9503 | −2.0410 |
| 6 | 2.69 | −16.501 | −12.962 |

FIG. 8 is a diagram of comparison between antenna performance of the terminal device in this embodiment and antenna performance of the terminal device in the prior art. In a practical application, an antenna in a mobile phone mainly works in two frequency bands: 880 megahertz to 960 megahertz, and 1710 megahertz to 1880 megahertz. FIG. 8-a is a diagram of comparison between antenna performance of the terminal device in the prior art and antenna performance of the terminal device in the present invention in the working frequency band of 880 megahertz to 960 megahertz. It can be apparently learned that, in the two frequency bands, antenna performance curves of the two terminal devices are also extremely close. The two antennas that work in the frequency band of 880 megahertz to 960 megahertz have almost same antenna performance in a frequency band of 880 megahertz to 925 megahertz. In a frequency band of 925 megahertz to 960 megahertz, the antenna performance of the terminal device in the prior art is slightly better than the antenna performance in this embodiment. FIG. 8-b is a diagram of comparison between antenna performance of the terminal devices in the prior art and in this embodiment of the present invention, where the antenna of the terminal device in the prior art and the antenna of the terminal device in this embodiment of the present invention work in the frequency band of 1710 megahertz to 1880 megahertz. For the two antennas that work in the frequency band of 1710 megahertz to 1880 megahertz, in a frequency band of 1710 megahertz to 1750 megahertz, the antenna performance of the terminal device in the prior art is slightly better than the antenna performance of the terminal device in this embodiment. In a frequency band of 1750 megahertz to 1880 megahertz, the antenna performance of the terminal device in this embodiment is slightly better than the antenna performance of the terminal device in the prior art. In this way, antenna performance is good, and moreover, the cover for covering the second antenna circuit covers only the front face of the exterior surface, which reduces a width of the terminal device, and reduces a size of the terminal device.

The foregoing antennas mentioned in this embodiment of the present invention in terms of comparison of antenna performance and comparison of a reflection loss and impedance of an antenna are both antennas of an antenna circuit.

This embodiment of the present invention provides an antenna circuit, and the antenna circuit includes a first antenna circuit, a second antenna circuit, a connection hole, and a connection conductor, where the first antenna circuit is disposed on a non-exterior surface of a terminal device; the second antenna circuit is disposed on an exterior surface of the terminal device, where the exterior surface is a surface of the terminal device visible to a user, and the non-exterior surface is disposed opposite to the exterior surface; and the connection hole penetrates through the non-exterior surface and the exterior surface, where the first antenna circuit and the second antenna circuit are electrically connected by using the connection hole, and that the first antenna circuit and the second antenna circuit are electrically connected by using the connection hole specifically includes: the first antenna circuit and the second antenna circuit are electrically connected by using the connection conductor that penetrates through the connection hole. In this way, compared with the prior art, the antenna circuit is no longer disposed on an outer surface of a rear enclosure; instead, the antenna circuit is disposed on the non-exterior surface of the terminal device and the exterior surface of the terminal device. Therefore, a length of the second antenna circuit disposed on the exterior surface is reduced. Accordingly, a material used to cover the second antenna circuit is accordingly reduced, which reduces a size of the terminal device while ensuring good antenna performance.

According to another aspect, an embodiment of the present invention provides a terminal device 1, where the terminal device 1 includes the antenna circuit 10.

The antenna circuit includes a first antenna circuit, a second antenna circuit, and a connection hole, where the first antenna circuit is disposed on a non-exterior surface of the terminal device; the second antenna circuit is disposed on an exterior surface of the terminal device, where the exterior surface is a surface of the terminal device visible to a user, and the non-exterior surface is disposed opposite to the exterior surface; and the connection hole penetrates through the non-exterior surface and the exterior surface, where the first antenna circuit and the second antenna circuit are electrically connected by using the connection hole.

According to still another aspect, an embodiment of the present invention provides a method for disposing an antenna circuit, and as shown in FIG. 9, the method includes:

Step 201: Dispose a first antenna circuit on a non-exterior surface of a terminal device.

Step 202: Dispose a second antenna circuit on an exterior surface of the terminal device.

The exterior surface is a surface of the terminal device visible to a user, and the non-exterior surface is disposed opposite to the exterior surface.

Step 203: Dispose, on the non-exterior surface and the exterior surface, a connection hole that penetrates through the non-exterior surface and the exterior surface.

Step 204: Electrically connect the first antenna circuit and the second antenna circuit by using the connection hole.

Specifically, in the terminal device, a connection conductor may be disposed in the connection hole, and the first antenna circuit and the second antenna circuit are electrically connected by using the connection conductor.

This embodiment of the present invention provides a method for disposing an antenna circuit, and the method includes: disposing a first antenna circuit on a non-exterior surface of a terminal device; disposing a second antenna circuit on an exterior surface of the terminal device, where the exterior surface is a surface of the terminal device visible to a user, and the non-exterior surface is disposed opposite to the exterior surface; disposing, on the non-exterior surface and the exterior surface, a connection hole that penetrates through the non-exterior surface and the exterior surface; and electrically connecting the first antenna circuit and the second antenna circuit by using the connection hole. In this way, compared with the prior art, the antenna circuit is no longer disposed on an outer surface of a rear enclosure; instead, the antenna circuit is disposed on the non-exterior surface of the terminal device and the exterior surface of the terminal device. Therefore, a length of the second antenna circuit disposed on the exterior surface is reduced. Accordingly, a material used to cover the second antenna circuit is accordingly reduced, which reduces a size of the terminal device while ensuring good antenna performance.

It should be noted that a sequence of the steps of the method for disposing an antenna circuit provided in this embodiment of the present invention may be properly adjusted, and a step may also be added or removed according to conditions. Any variation of the method that is readily figured out by a person skilled in the art within the technical scope disclosed in the present invention shall fall within the protection scope of the present invention, and therefore, details are not described again.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An antenna circuit, included in a terminal device, comprising:
   a first antenna circuit, the first antenna circuit being disposed on a non-exterior surface of the terminal device;
   a second antenna circuit, the second antenna circuit being disposed on an exterior surface of the terminal device, wherein the exterior surface is a surface of the terminal device visible to a user and the non-exterior surface is disposed opposite to the exterior surface; and
   a connection hole, wherein the connection hole penetrates through the non-exterior surface and the exterior surface,
   wherein the first antenna circuit and the second antenna circuit are electrically connected at the connection hole, and
   wherein a length of the first antenna circuit is greater than a length of the second antenna circuit.

2. The antenna circuit according to claim 1, further comprising:
a connection conductor,
wherein the first antenna circuit and the second antenna circuit are electrically connected by the connection conductor when the connection conductor penetrates through the connection hole.

3. The antenna circuit according to claim 2, wherein a draft angle of the connection hole with respect to the non-exterior surface and a draft angle of the connection hole with respect to the exterior surface are each from 15 degrees to 30 degrees inclusive.

4. The antenna circuit according to claim 2, wherein
the first antenna circuit is formed on the non-exterior surface by using a laser engraving technology;
the second antenna circuit is formed on the exterior surface by using a laser engraving technology; and
the connection conductor is formed inside the connection hole by using a laser engraving technology.

5. The antenna circuit according to claim 1, wherein a diameter of the connection hole is between 0.4 millimeter and 0.6 millimeter inclusive.

6. The antenna circuit according to claim 1, wherein a draft angle of the connection hole with respect to the non-exterior surface and a draft angle of the connection hole with respect to the exterior surface are each from 15 degrees to 30 degrees inclusive.

7. The antenna circuit according to claim 1, wherein a structure of the non-exterior surface is set based on a feature of the first antenna circuit.

8. A terminal device, comprising:
an antenna circuit, wherein the antenna circuit comprises:
a first antenna circuit, the first antenna circuit being disposed on a non-exterior surface of the terminal device;
a second antenna circuit, the second antenna circuit being disposed on an exterior surface of the terminal device, wherein the exterior surface is a surface of the terminal device visible to a user and the non-exterior surface is disposed opposite to the exterior surface; and
a connection hole, wherein the connection hole penetrates through the non-exterior surface and the exterior surface,
wherein the first antenna circuit and the second antenna circuit are electrically connected at the connection hole, and
wherein a length of the first antenna circuit is greater than a length of the second antenna circuit.

9. The terminal device according to claim 8, wherein the antenna circuit further comprises a connection conductor, and
wherein the first antenna circuit and the second antenna circuit are electrically connected by the connection conductor when the connection conductor penetrates through the connection hole.

10. The terminal device according to claim 9, wherein a draft angle of the connection hole with respect to the non-exterior surface and a draft angle of the connection hole with respect to the exterior surface are each from 15 degrees to 30 degrees inclusive.

11. The terminal device according to claim 9, wherein
the first antenna circuit is formed on the non-exterior surface by using a laser engraving technology;
the second antenna circuit is formed on the exterior surface by using a laser engraving technology; and
the connection conductor is formed inside the connection hole by using a laser engraving technology.

12. The terminal device according to claim 8, wherein a diameter of the connection hole is between 0.4 millimeter and 0.6 millimeter inclusive.

13. The terminal device according to claim 8, wherein a draft angle of the connection hole with respect to the non-exterior surface and a draft angle of the connection hole with respect to the exterior surface are each from 15 degrees to 30 degrees inclusive.

14. The terminal device according to claim 8, wherein a structure of the non-exterior surface is set based on a feature of the first antenna circuit.

15. A mobile phone, comprising:
an antenna circuit, wherein the antenna circuit comprises:
a first antenna circuit, the first antenna circuit being disposed on a non-exterior surface of the mobile phone;
a second antenna circuit, the second antenna circuit being disposed on an exterior surface of the mobile phone, wherein the exterior surface is a surface of the mobile phone visible to a user and the non-exterior surface is disposed opposite to the exterior surface; and
a connection hole, wherein the connection hole penetrates through the non-exterior surface and the exterior surface,
wherein the first antenna circuit and the second antenna circuit are electrically connected at the connection hole, and
wherein a length of the first antenna circuit is greater than a length of the second antenna circuit.

16. The mobile phone according to claim 15, wherein the antenna circuit further comprises a connection conductor, and
wherein the first antenna circuit and the second antenna circuit are electrically connected by the connection conductor when the connection conductor penetrates through the connection hole.

* * * * *